(12) United States Patent
Haraguchi (10) Patent No.: US 7,548,688 B2
(45) Date of Patent: Jun. 16, 2009

(54) OPTICAL APPARATUS

(75) Inventor: Shosuke Haraguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 11/139,260

(22) Filed: May 27, 2005

(65) Prior Publication Data

US 2005/0265706 A1 Dec. 1, 2005

(30) Foreign Application Priority Data

May 31, 2004 (JP) ............................. 2004-160370

(51) Int. Cl.
*G03B 13/02* (2006.01)
(52) U.S. Cl. ..................................... 396/147
(58) Field of Classification Search .................. 396/147
See application file for complete search history.

(56) References Cited

U.S. PATENT DOCUMENTS 5,579,079 A 11/1996 Yamada
5,802,408 A * 9/1998 Suda ........................... 396/296
6,920,284 B2 * 7/2005 Haraguchi et al. .......... 396/147
2005/0002663 A1 1/2005 Haraguchi
2005/0238344 A1 * 10/2005 Matsuda ..................... 396/121

FOREIGN PATENT DOCUMENTS

| JP | 1-277225 A | 11/1989 |
|---|---|---|
| JP | 4-278931 A | 10/1992 |
| JP | 5-333259 A | 12/1993 |
| JP | 10-048733 A | 2/1998 |
| JP | 2004-085808 A | 3/2004 |

* cited by examiner

Primary Examiner—W. B. Perkey
(74) Attorney, Agent, or Firm—Canon USA Inc IP Div (57) ABSTRACT

An optical apparatus having a viewfinder optical system includes a Fresnel lens capable of converging light onto a focusing screen and a plurality of microprism groups disposed in positions corresponding to focusing areas. Beams of light are projected onto each microprism group.

7 Claims, 12 Drawing Sheets

OPTICAL APPARATUS

BACKGROUND OF THE INVENTION

1. Field of the Invention

The present invention relates to an optical apparatus, such as a single lens reflex camera, capable of providing superimposed displays in focal point detection regions for automatic focusing.

2. Description of the Related Art

Known cameras capable of superimposed display are disclosed in Japanese Patent Laid-Open Nos. 1-277225 and 5-333259 (corresponding to U.S. Pat. No. 5,579,079). In such a known camera, fluxes of light emitted from an illuminating unit disposed in front of a pentaprism are reflected at a quick return mirror including a half mirror via a projection lens and illuminates a plurality of display units on a focusing screen.

Japanese Patent Laid-Open No. 4-278931 discloses a method for illuminating display bodies on a focusing screen with light emitted from an illuminating unit disposed in the front portion of a pentaprism and transmitting the light through the pentaprism. Japanese Patent Laid-Open No. 10-048733 discloses a camera that includes an information display for displaying shutter speed and aperture disposed in a viewfinder. This information display includes a distance-measuring point display unit corresponding to the actual distance-measuring point.

The cameras disclosed in Japanese Patent Laid-Open Nos. 1-277225 and 5-333259 have a long light path from the illuminating unit to the focusing screen. Moreover, since the fluxes of light are refracted and reflected repeatedly by the projection lens and the main mirror and since the main mirror is a half mirror, the efficiency of light-guiding is low. Therefore, the amount of space required for the illuminating unit becomes large. Furthermore, since such a camera requires adjustment, the size of the camera body increases, productivity decreases, and production cost increases. When focus point detection frames are illuminated using light from light-emitting diodes (LEDs), there is no problems in photographing in a lighted area. However, when photographing in a darker area, the LED light is too bright and irritates the photographer's eyes.

The camera disclosed in Japanese Patent Laid-Open No. 4-278931 transmits light through the pentaprism to illuminate the focusing screen. Therefore, the light path is short and light-guiding efficiency is high. However, since the illuminating unit is disposed in the front portion of the pentaprism, it becomes difficult to dispose a flash-emitting device inside the camera on the front portion of the pentaprism. Since the display on the focusing screen is a mirror, the display does not transmit light from the object. Therefore, when the photographer looks into the viewfinder, the viewfinder is blacked out and it becomes difficult to see the object when the object includes two parallel lines and/or a cross. The surface of the mirror is prepared by depositing a metal film, and therefore, production cost is high. Furthermore, if the metal film for the mirror is deposited in an area displaced from the desired area, an inclined surface and the deposited area are misaligned and thus visibility becomes low.

The camera disclosed in Japanese Patent Laid-Open No. 10-048733 includes an information display, which is used for displaying shutter speed and aperture, disposed outside of the field of view of a known viewfinder. This information display includes a distance-measuring point display unit corresponding to an actual distance-measuring point. In this way, the selected distance-measuring point can be displayed without increasing the production cost of the camera. However, there is a difference in the distance-measuring point displayed and the actual distance-measuring point. For this reason, the visibility of the display is not satisfactory.

By taking into consideration the problems described above, a camera that provides excellent superimposed displays has been provided by the assignee (Japanese Patent Laid-Open No. 2004-085808). This camera is small and can be produced at low cost. Moreover, productivity is improved because the camera does not require adjustment of the light used for illumination.

Figure 15:
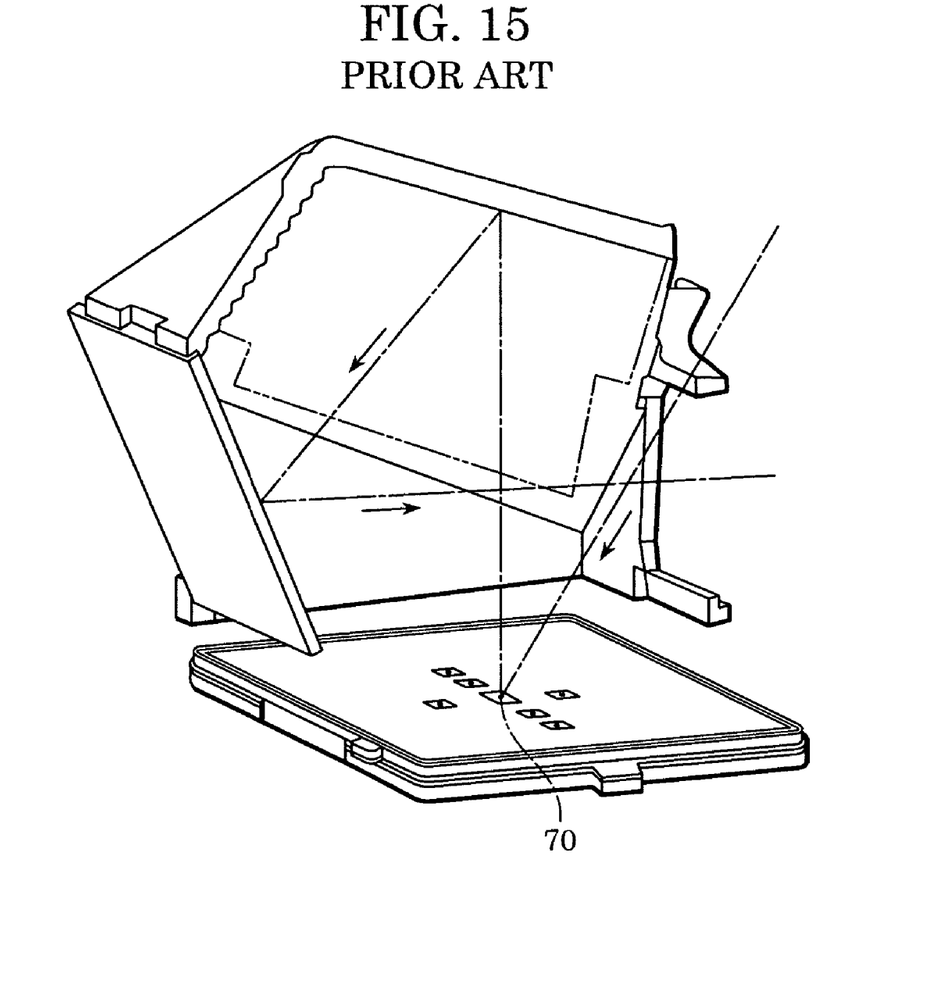
FIG. 15 is a perspective view illustrating a known method for superimposition illumination.
Figure 16:
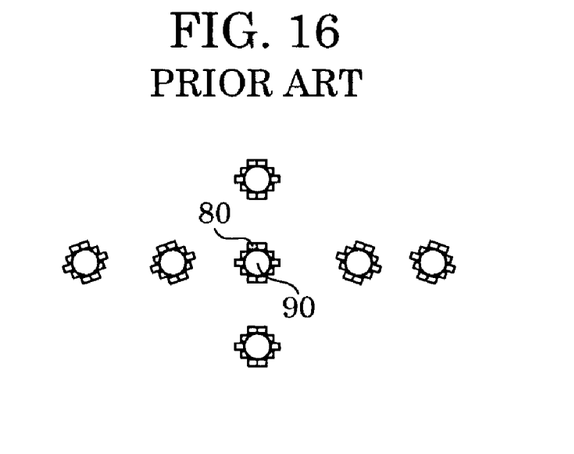
FIG. 16 is an enlarged view of a known reflection unit.

FIGS. 15 and 16 illustrate the main parts of the camera disclosed in Japanese Patent Laid-Open No. 2004-085808. FIG. 15 is a perspective view illustrating a known method for emitting light for superimposed displays. FIG. 16 is an enlarged view of the known reflection unit illustrated in FIG. 15. The camera illustrated in FIGS. 15 and 16 includes an automatic focus (AF) device having a plurality of focal point detection regions and superimposed displays corresponding to the plurality of focal point detection regions for automatic focusing. A light source is disposed on the side of a focusing screen closer to the eyepiece. Moreover, superimposed display patterns 70 for displaying the points corresponding to the plurality of focal point detection regions are provided on the eyepiece-side of the focusing screen. The superimposed display patterns 70 each includes a reflective angle-forming surface group 80 and a light-reflecting surface-processed unit 90 (an area that has been coated with a reflective metal) having a smaller surface area than the reflective angle-forming surface group 80. The superimposed display patterns 70 are irradiated with light from the light source to provide superimposed displays for automatic focusing.

SUMMARY OF THE INVENTION

The present invention is directed to an optical apparatus. According to an aspect of the present invention, an optical apparatus having a viewfinder optical system is provided. The optical apparatus includes a focusing screen including a mat surface configured to check a focusing condition on a first side, a Fresnel lens capable of converging light onto a second side, and groups of microprisms disposed at positions corresponding to focusing areas on the second side. The apparatus also includes an image-rotating optical system configured to rotate an image on the focusing screen into an upright and unreversed image, and light sources projecting light to the groups of microprisms.

Further features and advantages of the present invention will become apparent from the following description of exemplary embodiments (with reference to the attached drawings).

DESCRIPTION OF THE EMBODIMENTS

First Embodiment

Figure 1:
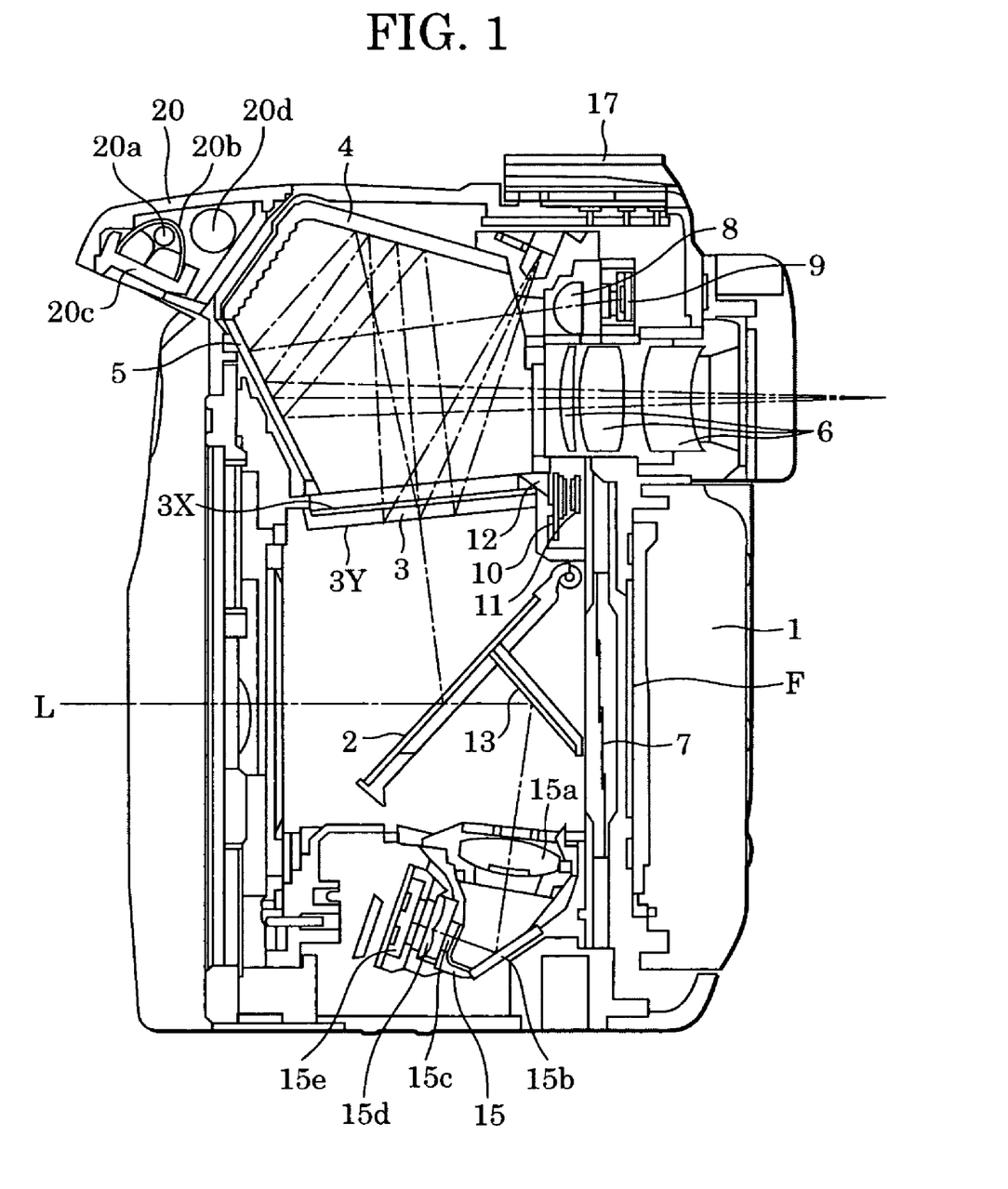
FIG. 1 is a cross-sectional view taken along the longitudinal center line of a camera according to a first embodiment of the present invention.

FIG. 1 is a cross-sectional view taken along the longitudinal center line of a single lens reflex camera according to a first embodiment of the present invention. A beam of light L from an object is emitted through a photographing optical system (imaging optical system) not shown in the drawing. When a main mirror (half mirror) 2 is at an observation position (the position illustrated in FIG. 1 or a "mirror-down position"), the beam of light L is reflected at the main mirror 2 and is projected on a mat surface 3X on the upper side of a focusing screen 3. The lower side of the focusing screen 3 is a Fresnel lens surface 3Y for converging light from the object. An image of the object projected on the focusing screen 3 is observed by the photographer via a hollow pentamirror 4, a third reflective mirror 5, and an eyepiece unit 6. The hollow pentamirror 4 rotates the image of the object so that the image appears upright and unreversed convergent image. When the main mirror 2 is at a photographing position ("mirror-up position"), not shown in the drawing, a focal plane shutter 7 is driven to expose film F to the light L from the object.

Figure 2:
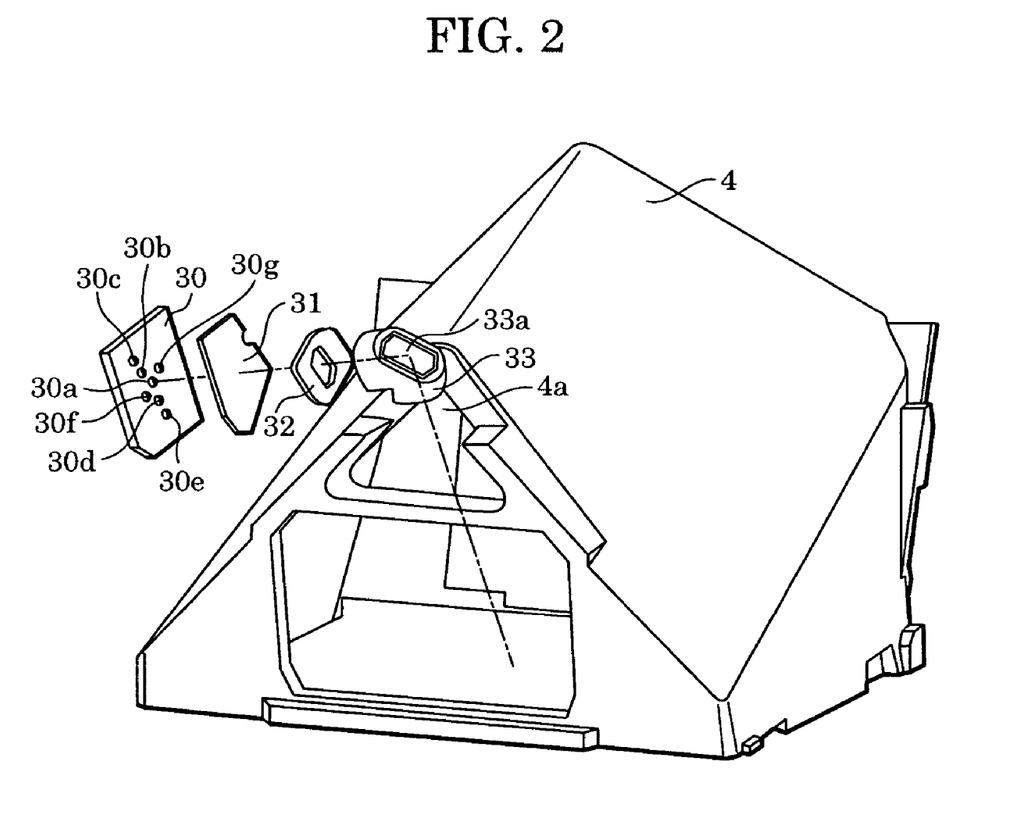
FIG. 2 is an exploded perspective view of an illuminating unit for superimposition according to a first embodiment of the present invention.
Figure 3:
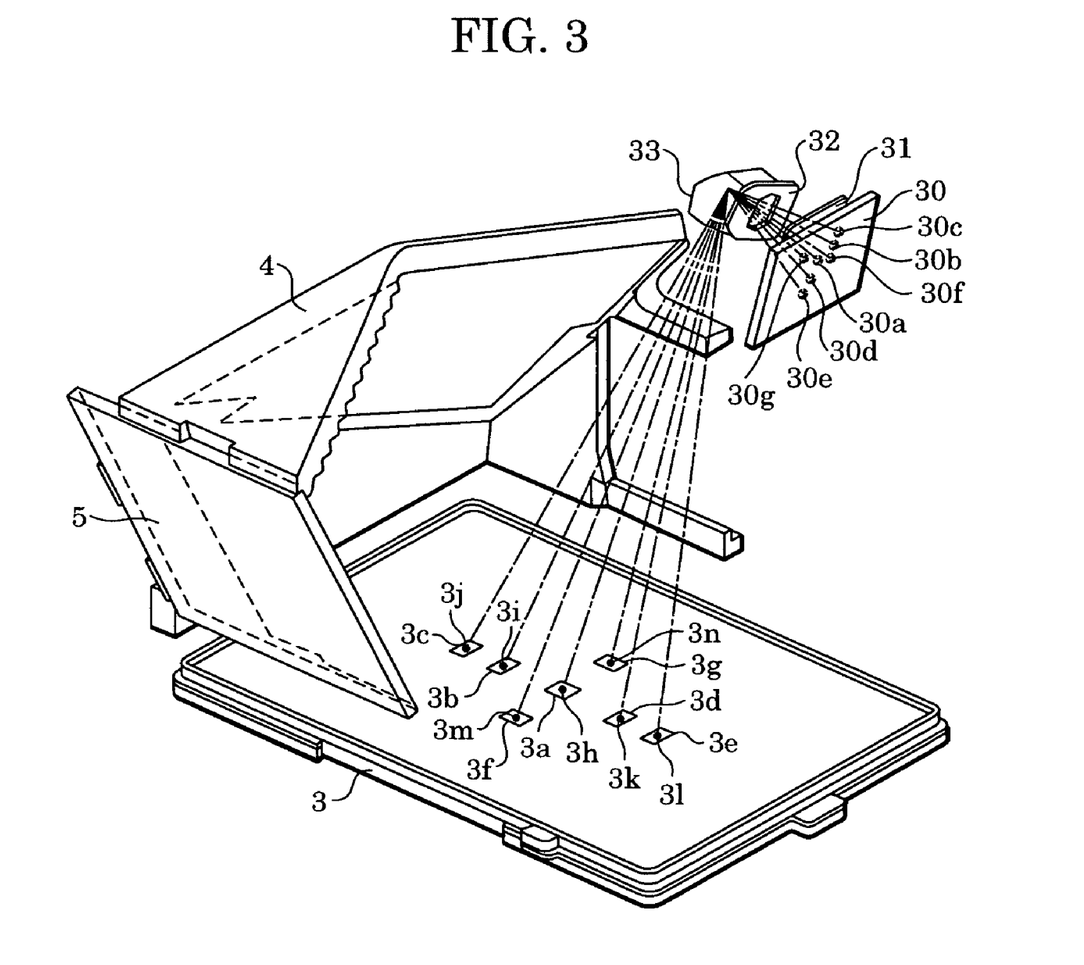
FIG. 3 illustrates of focal point detection frames according to a first embodiment of the present invention being illuminated.

A known photometry lens 8 and a photometry sensor 9 for measuring the brightness of the object are disposed above the eyepiece unit 6. An inner-viewfinder liquid crystal display (LCD) 10 for displaying information concerning conditions for photographing outside the field of view of the viewfinder, an inner-viewfinder LCD 11 for displaying information, and a triangular prism 12 for guiding light that has been transmitted through the LCD 10 to the viewfinder are disposed below the eyepiece unit 6. An illuminating unit for superimposition is interposed between the hollow pentamirror 4 and the photometry lens 8. Details of this illuminating unit are illustrated in FIGS. 2 and 3.

Figure 4:
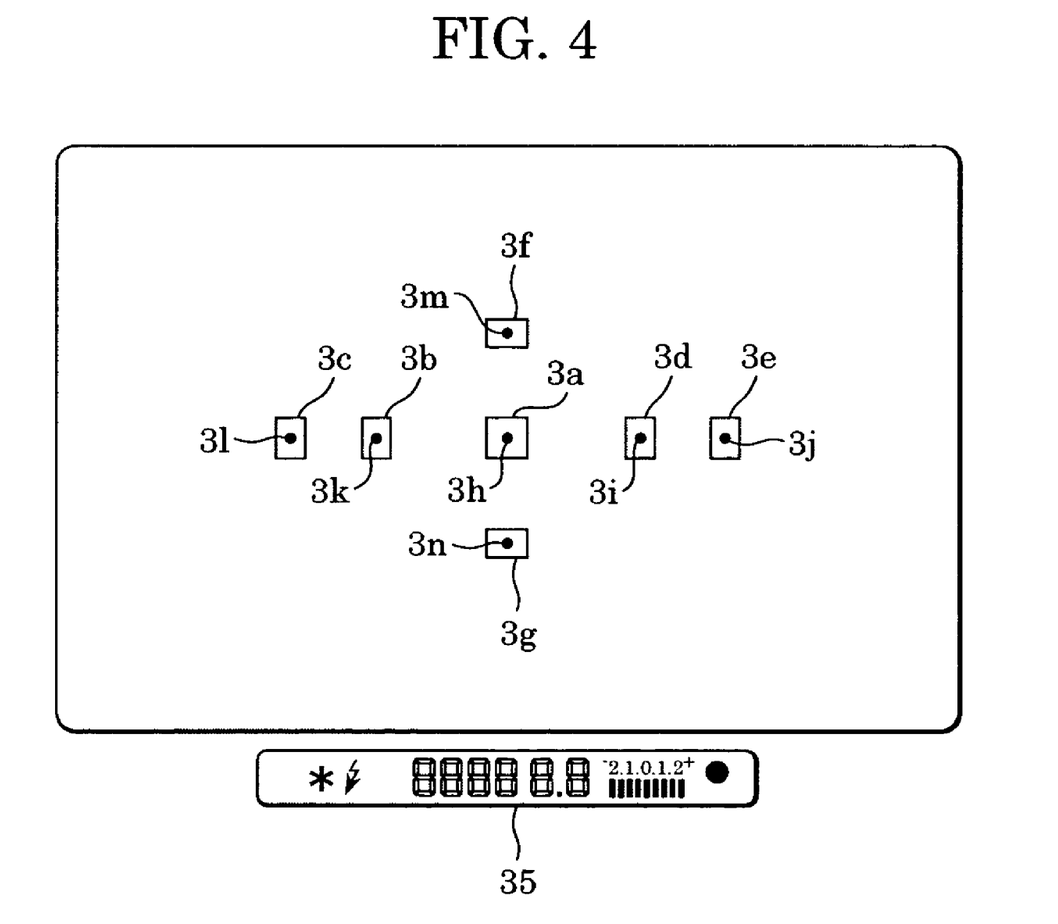
FIG. 4 illustrates the field of view of a viewfinder according to a first embodiment of the present invention.

A submirror 13 is disposed behind the main mirror 2 to reflect a flux of light that has passed through the main mirror 2 to a focal point-detecting unit 15 disposed at the lower portion of the camera body. The focal point-detecting unit 15 includes a field lens 15a disposed in the vicinity of the image-forming plane, a reflective mirror 15b, an aperture stop 15c, a secondary image-forming lens 15d, and an automatic focus (AF) sensor 15e. The focal point-detecting unit 15 according to the first embodiment of the present invention detects the focal point by a known phase contrast method. As illustrated in FIG. 4, a plurality of regions (seven regions) in the observation display (within the field of view of the viewfinder) is defined as focal point detection regions to detect the focal point.

An accessory shoe 17 is disposed directly above the optical axis of the lens in the upper portion of the camera body. An external flash-emitting device may be attached to the accessory shoe 17.

A light-emitting unit 20 of a flash-emitting device disposed inside the camera includes a xenon (Xe) tube 20a, a reflective shade 20b, a panel 20c, and a trigger coil 20d. When not in use, the light-emitting unit 20 is disposed at the frontal region of the hollow pentamirror 4, as illustrated in FIG. 1. When in use, the light-emitting unit 20 is rotated clockwise around a hinge axis, not shown in the drawing, so that the light-emitting unit 20 pops up above the camera body.

FIG. 2 is an exploded perspective view of an illuminating unit for superimposition according to the first embodiment of the present invention. An LED 30 for providing illumination for superimposition is disposed on the back of the hollow pentamirror 4 on the side of the eyepiece unit 6. The LED 30 includes seven chip-type LEDs disposed in positions corresponding to the focal point detection regions of the focusing screen 3. The seven chip-type LEDs are LED-C 30a, LED-L1 30b, LED-L2 30c, LED-R1 30d, LED-R2 30e, LED-T 30f, and LED-B 30g. A diffusion plate 31 diffuses the light from the LED 30 to increase the area being illuminated. The diffusion plate 31 also makes the shadows caused by the wire bonding, which is provided during production of the LED 30, to appear less apparent while the LED 30 is illuminated. An aperture stop 32 prevents ghosts from being generated by eliminating unwanted light emitted from the LED 30. A reflective surface 33a is provided by reflective coating on a prism 33 for superimposition. The light from the LED 30 is guided into the hollow pentamirror 4 via an opening 4a on the hollow pentamirror 4. This light is emitted to the focal point detection frames corresponding to the focal point detection regions of the focusing screen 3.

FIG. 3 illustrates the LED 30 for providing illumination for superimposition illuminating the focal point detection frames of the focusing screen 3. FIG. 3 illustrates cross-sectional views of the hollow pentamirror 4 and the third reflective mirror 5 along their center line.

As illustrated in FIG. 3, the LED-C 30a illuminates a central focal point detection frame 3a and its vicinity; the LED-L1 30b illuminates a middle left focal point detection frame 3b and its vicinity; the LED-L2 30c illuminates a left focal point detection frame 3c and its vicinity; the LED-R1 30d illuminates a middle left focal point detection frame 3d and vicinity; the LED-R2 30e illuminates a right focal point detection frame 3e and its vicinity; the LED-T 30f illuminates a upper focal point detection frame 3f and its vicinity; and the LED-B 30g illuminates a lower focal point detection frame 3g and its vicinity. The light from the LEDs 30a, 30b, 30c, 30d, 30e, 30f, and 30g are reflected at total-reflection prisms 3h, 3i, 3j, 3k, 3l, 3m, and 3n, which are disposed at the center of the back side of the focal point detection frames 3a, 3b, 3c, 3d, 3e, 3f, and 3g, respectively, on the Fresnel lens surface 3Y. Then the light is observed by the photographer via the hollow pentamirror 4, the third reflective mirror 5, and the eyepiece unit 6.

FIG. 4 illustrates a display screen of a viewfinder of a camera according to the first embodiment of the present invention. The seven focal point detection frames 3a, 3b, 3c, 3d, 3e, 3f, and 3g corresponding to the focal point detection regions of the focal point-detecting unit 15 are disposed on the shooting screen. Since FIG. 4 illustrates the focal point detection frames, shown in FIG. 3, viewed via the hollow pentamirror 4 and the third reflective mirror 5, the left and right positions are reversed in comparison to FIG. 3. Light from the LED 30 is projected in fluxes of light to illuminate each of the total-reflection prisms 3h, 3i, 3j, 3k, 3l, 3m, and 3n in the focal point detection frames but not to illuminate the reflection region of the neighboring focal point detection frames. Since the prisms of the focal point detection frames transmit part of the light L from the object, the focal point detection frames appear as semi-transparent areas darker than the peripheral mat area to the photographer. The reflective areas at the center of each of the focal point detection frames also appear as dark semi-transparent areas. As a result, the total-reflection prisms appear as black spots to the photographer. The diameter of the total-reflection prisms should be smaller than 0.2 mm so that the superimposed light reflected from the LED 30 is easily perceived while the superimposed light does not interfere with the image displayed on the viewfinder.

An inner-viewfinder information display 35 for displaying information required for photographing, such as shutter speed, numerical aperture, and completion of battery charging of the flash-emitting unit, is located at the bottom the field of view.

Figure 5:
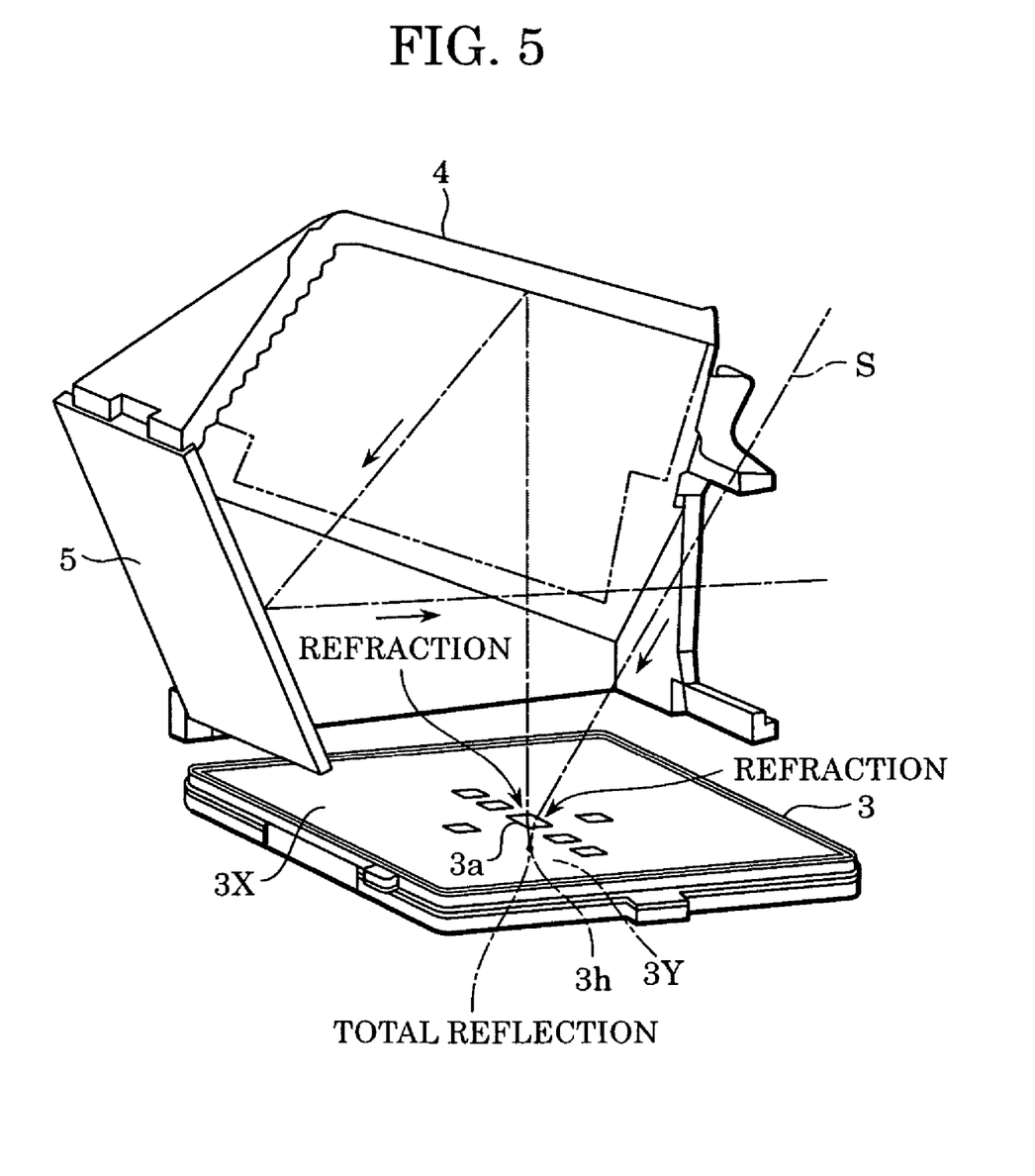
FIG. 5 is a perspective view illustrating a method for superimposed illumination according to a first embodiment of the present invention.

FIG. 5 is a perspective view illustrating a method for providing illumination for superimposition according to the first embodiment of the present invention. The mat surface 3X is provided on the upper surface of the focusing screen 3 on the side of the eyepiece unit 6. The Fresnel lens surface 3Y is provided on the lower surface of the focusing screen 3 or, i.e., the back side of the mat surface 3X. A beam S of light is projected from the LED 30 to the central focal point detection frame 3a for superimposition. The method for superimposing on the central focal point detection frame 3a is described below as a typical example of superimposing on a focal point detection frame. The focal point detection frame 3a is provided on the mat surface 3X. The focal point detection frame 3a does not illuminate even when light is projected from the LED 30. The total-reflection prism 3h is formed on the Fresnel lens surface 3Y on the focusing screen 3. The total-reflection prism 3h guides the light projected from the LED 30 to the photographer's eye points.

Figure 6:
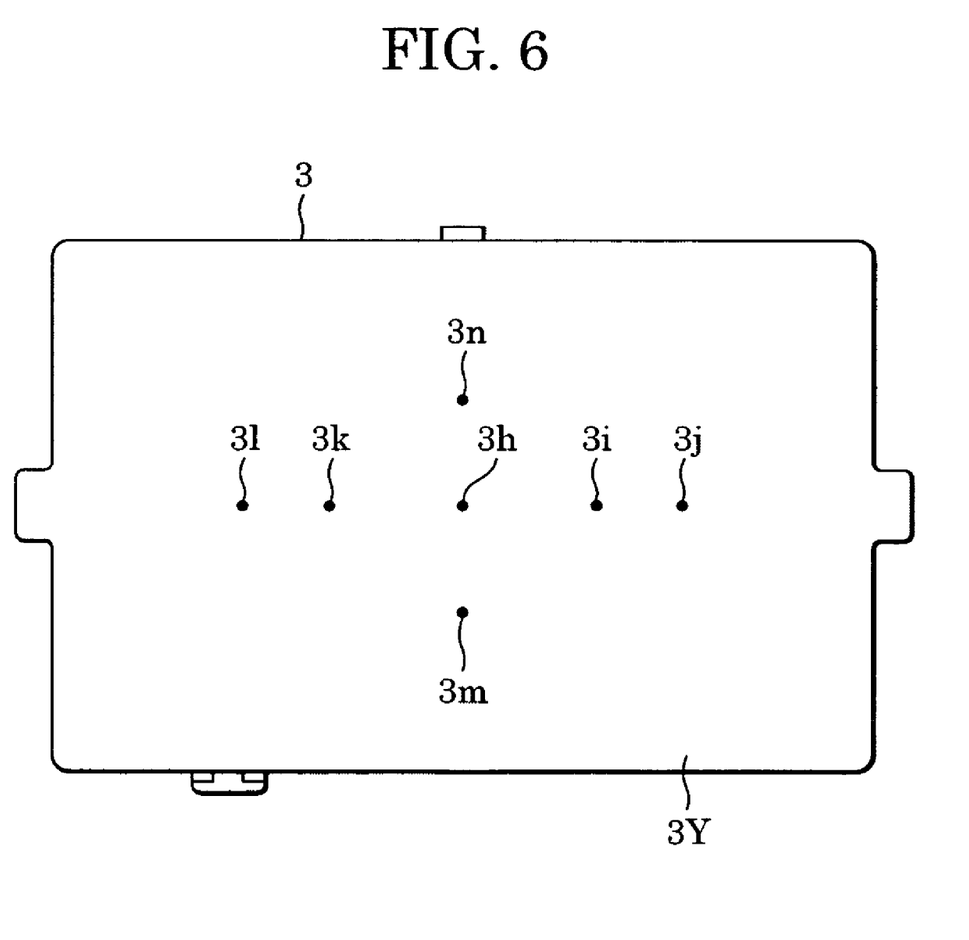
FIG. 6 illustrates a Fresnel lens surface of a focusing screen according to a first embodiment of the present invention.

FIG. 6 illustrates the Fresnel lens surface 3Y of the focusing screen 3 according to the first embodiment of the present invention. In other words, FIG. 6 illustrates the focusing screen 3, illustrated in FIG. 5, viewed from below. The total-reflection prisms 3h, 3i, 3j, 3k, 3l, 3m, and 3n are provided on the Fresnel lens surface 3Y.

Details of the structures of the total-reflection prisms 3h, 3i, 3j, 3k, 3l, 3m, and 3n are described below.

FIGS. 7 to 11 illustrate details of the shapes of five typical total-reflection prisms among the seven total-reflection prisms 3h, 3i, 3j, 3k, 3l, 3m, and 3n. More specifically, FIG. 7A is a plan view of the total-reflection prism 3n, and FIG. 7B is a side view of the total-reflection prism 3n; FIG. 8A is a plan view of the total-reflection prism 3h, and FIG. 8B is a side view of the total-reflection prism 3h; FIG. 9A is a plan view of the total-reflection prism 3m, and FIG. 9B is a side view of the total-reflection prism 3m; FIG. 10A is a plan view of the total-reflection prism 3l, and FIG. 10B is a side view of the total-reflection prism 3l; and FIG. 11A is a plan view of the total-reflection prism 3k, and FIG. 11B is a side view of the total-reflection prism 3k. The total-reflection prisms 3i and 3j are not illustrated in the drawings since they are symmetrical to the total-reflection prisms 3k and 3l, respectively.

Figure 12:
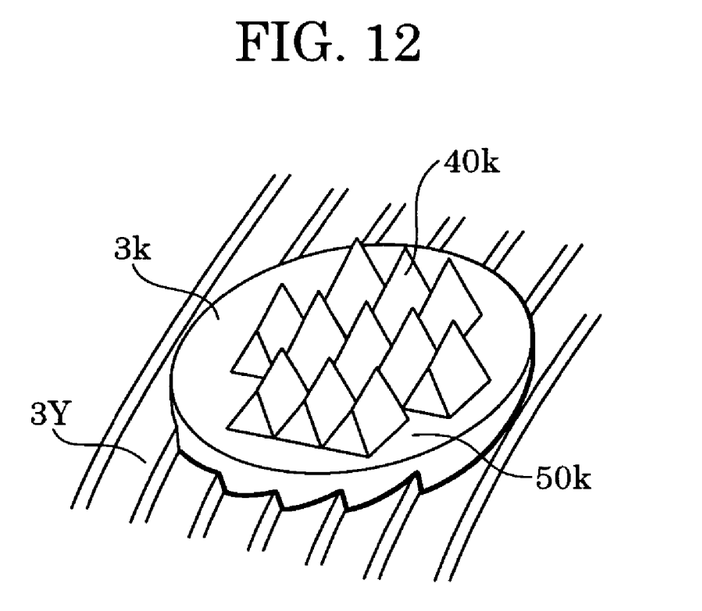
FIG. 12 is a schematic view the structure of a total-reflection prism according to a first embodiment of the present invention.
Figure 13:
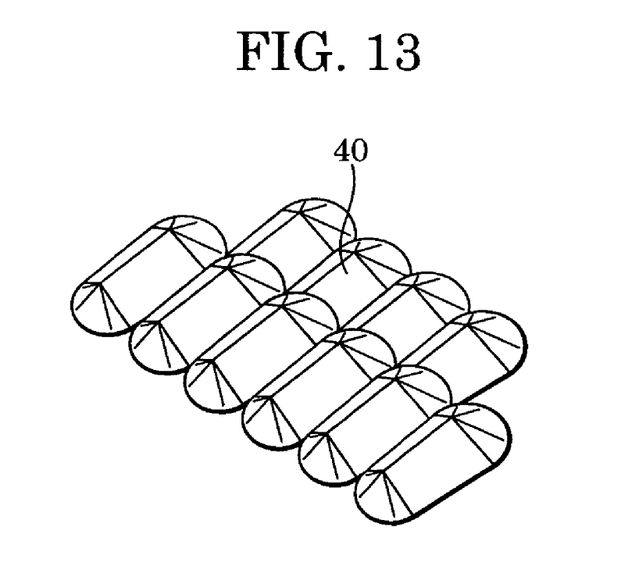
FIG. 13 illustrates the detailed arrangement of microprisms according to a first embodiment of the present invention.

FIG. 12 is a schematic view the structure of the total-reflection prism 3k, which is one of the seven total-reflection prisms 3h, 3i, 3j, 3k, 3l, 3m, and 3n according to the first embodiment of the present invention. FIG. 13 illustrates the detailed arrangement of microprisms 40 according to the first embodiment of the present invention.

Figure 8A:
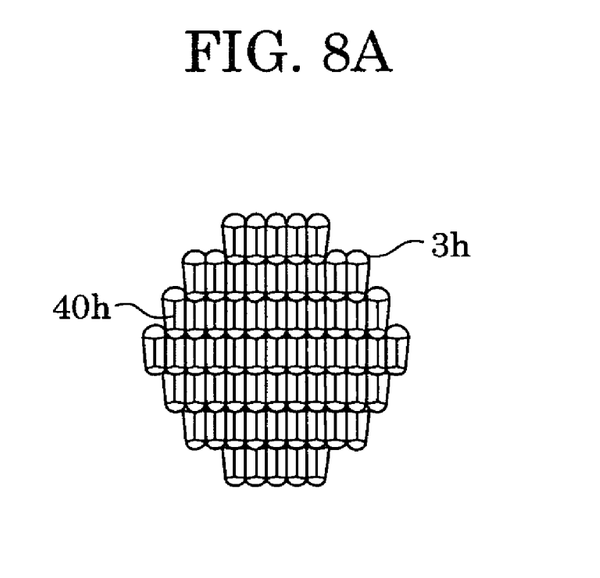
FIGS. 8A and 8B are a plan view and a side view, respectively, of a total-reflection prism 3h illustrated in FIG. 6.

The total-reflection prisms 3h, 3i, 3j, 3k, 3l, 3m, and 3n are provided on the Fresnel lens surface 3Y. The Fresnel lens surface 3Y has a stair-like curved surface, as illustrated in FIG. 12. If microprisms 40 (microprism 40k in the drawing) are directly formed on the Fresnel lens surface 3Y, the shape of the parts connecting with the Fresnel lens surface 3Y becomes complex. Therefore, it becomes difficult to accurately process a metal mold for the structure. Moreover, the peripheral shape of the group of microprisms 40 becomes interrupted and visibility is reduced. According to the first embodiment of the present invention, a flat surface portion 50 (plane 50k in the drawing) is provided to solve the above-mentioned problem. The flat surface portion 50 is an oval base provided to increase the visibility of the displayed points. This is the same for the total-reflection prisms 3i, 3j, 3l, 3m, and 3n. The central total-reflection prism 3h, however, does not have a flat surface portion, as illustrated in FIG. 8A, since it is disposed in the center where the Fresnel lens surface 3Y does not have any bumps of the stair-like shape. A flat surface portion 50h may be provided for the total-reflection prism 3h so that the same visibility as the other prisms is achieved.

Details of the microprisms 40 will be described below.

Figure 7A:
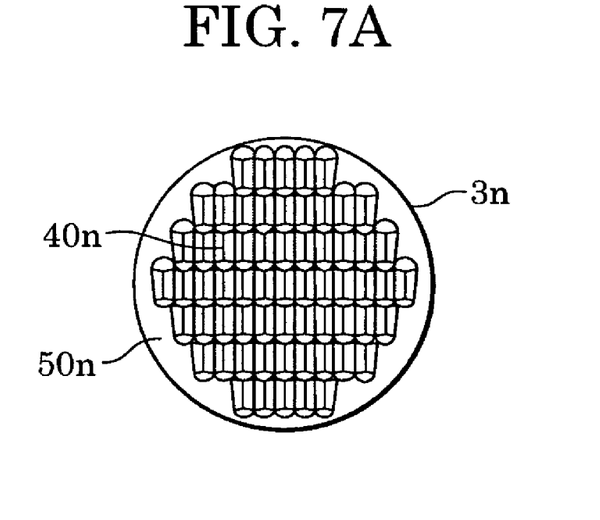
FIGS. 7A and 7B are a plan view and a side view, respectively, of a total-reflection prism 3n illustrated in FIG. 6.
Figure 7B:
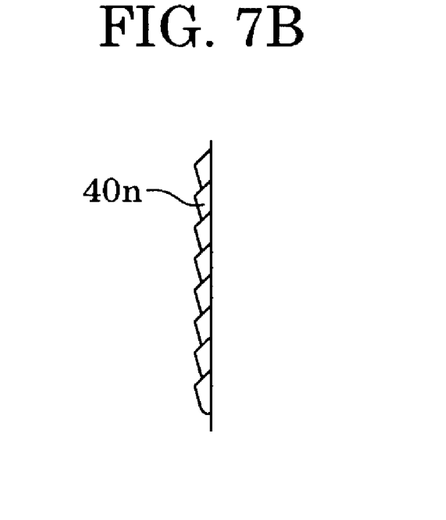
Figure 8B:
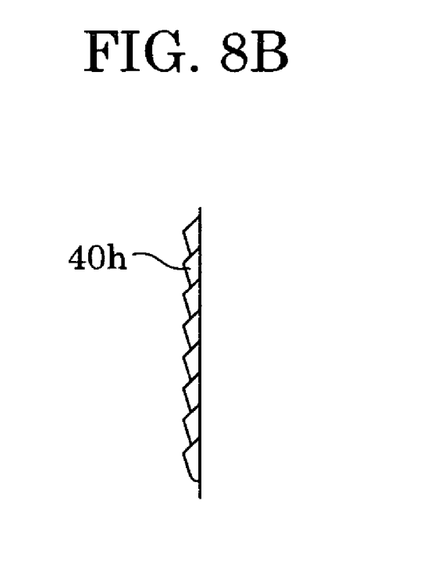
Figure 9A:
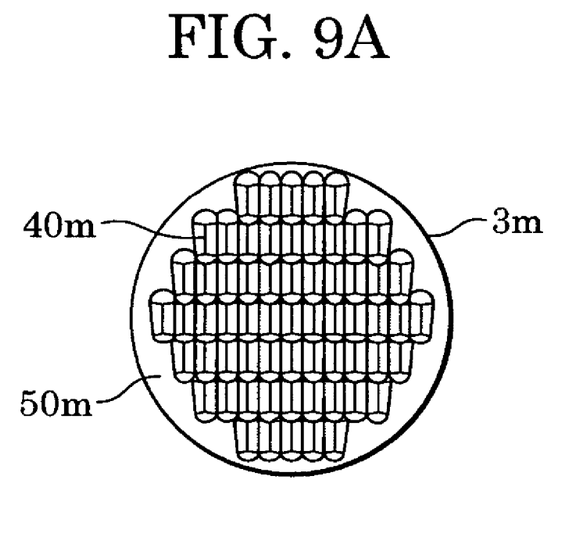
FIGS. 9A and 9B are a plan view and a side view, respectively, of a total-reflection prism 3m illustrated in FIG. 6.
Figure 9B:
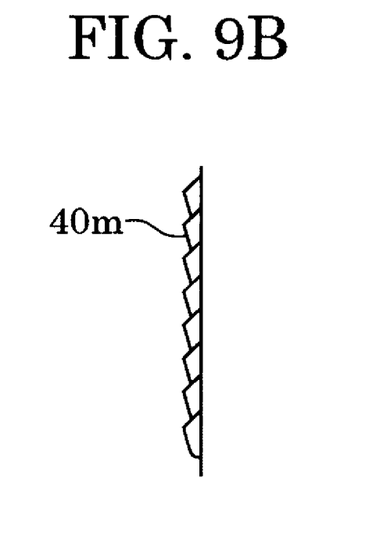

The microprisms 40, as illustrated in FIG. 13, are total-reflection prisms having a 90-degree apex. All of the microprisms 40 are processable by the same bite (blade edge). The apexes of total-reflection prisms 3n, 3h, and 3m, illustrated in FIGS. 7 to 9, are disposed along the optical axis (the optical axis of the lens in which the light L from the object enters). The tilt, illustrated in the side views (refer to FIGS. 7B, 8B, 9B, 10B and 11B), are set so that the light projected from the light source is reflected at an angle that guides the light to the photographer's eye points, as illustrated in FIG. 1. According to the first embodiment, the pitch of the apexes of the microprisms 40 (i.e., the distance between adjacent apexes) is 16 µm and the pitch in the direction of the optical axis is 30 µm.

Figure 10A:
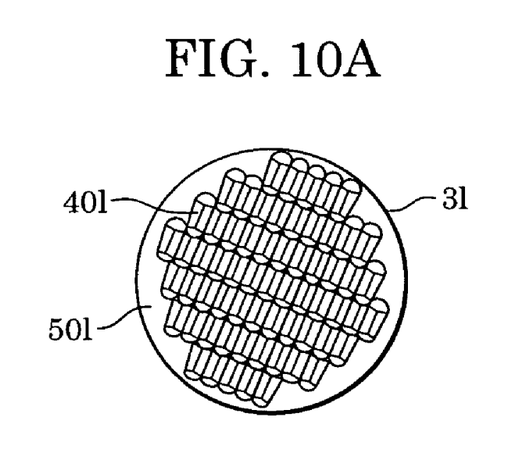
FIGS. 10A and 10B are a plan view and a side view, respectively, of a total-reflection prism 3l illustrated in FIG. 6.
Figure 10B:
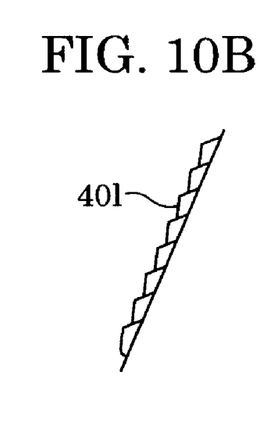
Figure 11A:
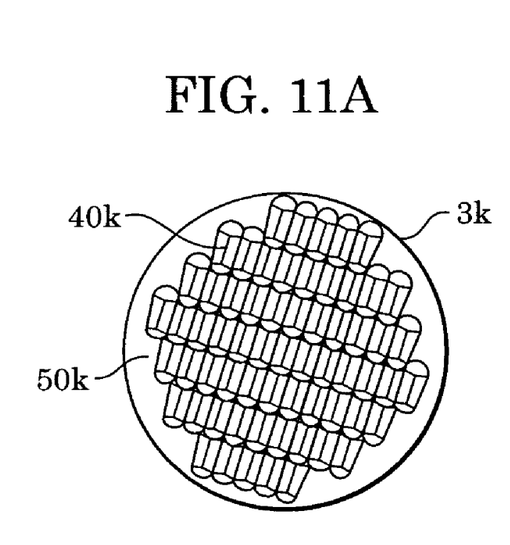
FIGS. 11A and 11B are a plan view and a side view, respectively, of a total-reflection prism 3k illustrated in FIG. 6.
Figure 11B:
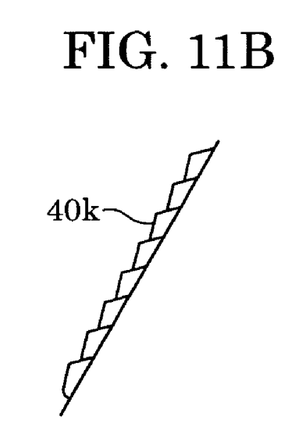

The total-reflection prisms 3l and 3k, as illustrated in FIGS. 10 and 11, respectively, are rotated so as to reflect the light beams to the photographer's eye points. As illustrated in FIG. 13, the tapering caused by the bite for processing the metal mold remains on the microprisms 40. However, as illustrated in FIG. 13, by disposing the microprisms 40 closely adjacent to each other, the entire reflective surface of the microprisms 40 is maximized. The microprisms 40 are disposed in a parallel arrangement.

A Second Embodiment

Figure 14:
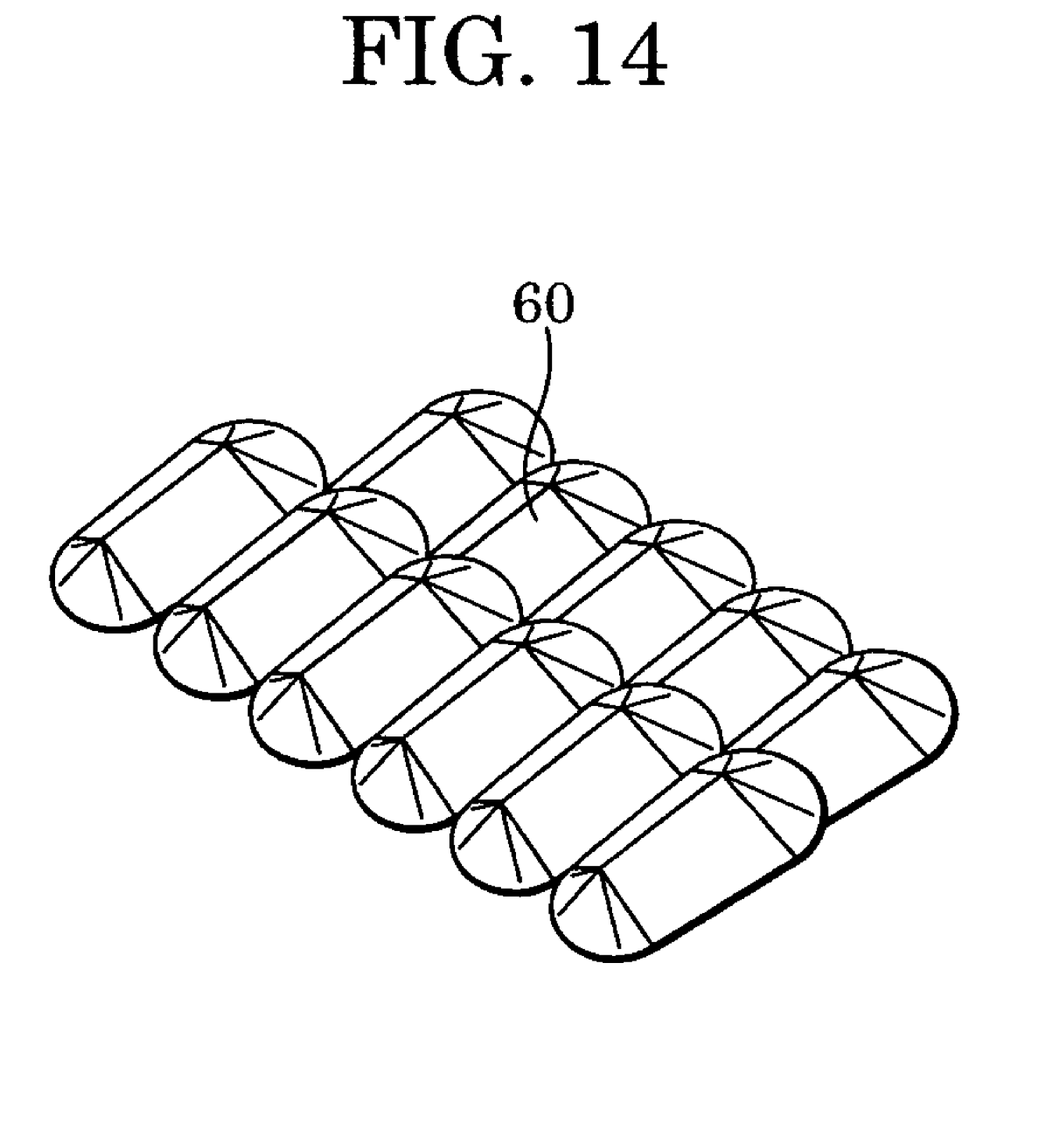
FIG. 14 illustrates the detailed arrangement of microprisms according to a second embodiment of the present invention.

FIG. 14 illustrates, in detail, the arrangement of microprisms according to a second embodiment of the present invention. According to the second embodiment, microprisms 60 are arranged in a staggered pattern. Similar to the parallel arrangement of the microprisms 40 illustrated in FIG. 13, the microprisms 60 are disposed closely adjacent to each other so as to maximize the reflective surface and to achieve a bright display.

Last, the advantages of the single lens reflex camera according to the embodiments of the present invention are listed below:

(1) By employing the total-reflection prisms 3h, 3i, 3j, 3k, 3l, 3m, and 3n, reflective coating does not have to be provided to form a reflective surface. The complete function of the total-reflection prisms is realized by using only the plastic molded focusing screen 3. Accordingly, a small camera having the display unit capable of high quality superimposition with high visibility without any displacement can be provided at low production cost. Since the mat surface 3X is interposed between the eyepiece unit 6 and the total-reflection prisms 3h to 3n, high quality superimposition with high visibility without any shading in the illuminated light can be provided.

(2) Since the total-reflection prisms 3h, 3i, 3j, 3k, 3l, 3m, and 3n each comprise a group of the microprisms 40 or microprisms 60, the height of the prisms are low. In this way, a superimposed display with uniform diopter is provided. In other words, when a photographer looks into a focusing lens via an eyepiece and focuses on the microprisms having a low height, the photographer will be looking at a substantially flush surface and thus the entire surface of the microprisms will appear uniform (or appear as having the same diopter). Moreover, because the total-reflection prisms comprise a group of microprisms, the outer shape of the total-reflection prism that determines the shape of the superimposed displays can be freely adjusted.

(3) Since the microprisms 40 and 60 are disposed in series, the effective reflective area is maximized and bright superimposed displays that have sufficient reflective intensity are provided.

(4) Since the total-reflection prisms 3i to 3n are disposed in the flat surface portion 50 that is provided independently of the Fresnel lens, the Fresnel lens and the total-reflection prisms do not interfere with each other. Accordingly, the workability of the prism lens increases for the metal mold production. Moreover, a superimposed display that has a clear end face is provided.

(5) Since the superimposed displays of the focal point detection regions for automatic focusing are points, when the photographer looks into the viewfinder, the points can be clearly visible when the displays are illuminated. On the other hand, when the display is not illuminated, the points neither stand out nor interfere with the viewfinder.

(6) Although the camera is small, light is projected along the optical axis of the viewfinder and thus the surface of the total-reflection prism is provided as simple shapes. In other words, since light is projected along the optical axis of the viewfinder and reflected to the eye points, the total-reflection prisms do not have to be tiled in an extreme angle.

(7) Since the light-emitting unit 20 of the flash-emitting device inside the camera is disposed in the frontal area of the hollow pentamirror 4, a camera having both superimposed displays and a built-in strobe light is provided.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-160370 filed May 31, 2004, which is hereby incorporated by reference herein.

What is claimed is:

1. An optical apparatus having a viewfinder optical system, comprising:
    a focusing screen including a Fresnel surface configured to converge light and a mat surface configured to diffuse light, the Fresnel surface being formed on a subject side of the focusing screen, and the Fresnel surface having tapers that reflect light from an eyepiece side of the focusing screen, and the mat surface being formed on the eyepiece side of the focusing screen;
    an image-rotating optical system configured to rotate an image on the focusing screen into an upright and unreversed image; and
    light sources projecting light to the tapers.

2. The optical apparatus according to claim 1,
    wherein the image-rotating optical system includes an eyepiece, and
    wherein the light sources are disposed in the vicinity of the eyepiece.

3. The optical apparatus according to claim 1, wherein the image-rotating optical system includes an opening adapted to receive fluxes of light from the light sources.

4. The optical apparatus according to claim 1, wherein each of the light sources includes a light-emitting diode, a diffusion plate, an aperture stop, and a prism.

5. The optical apparatus according to claim 1, wherein the tapers include reflection surfaces directing the fluxes of light from the light sources to eye points of the image-rotating optical system.

6. The optical apparatus according to claim 1, wherein the tapers are disposed adjacent to each other.

7. The optical apparatus according to claim 1, further comprising a flat surface portion disposed in the periphery of the tapers.

* * * * *